United States Patent
Gualdoni et al.

[19]

[11] Patent Number: 6,012,288

[45] Date of Patent: Jan. 11, 2000

[54] MASTER CYLINDER HAVING RADIALLY FORMED END PLUGS AND PRESS-FIT CAGED SPRING ASSEMBLY PIN

[75] Inventors: Glenn R. Gualdoni, Canton; Serge G. Avenel, Novi, both of Mich.

[73] Assignee: Kelsey-Hayes Company, Livonia, Mich.

[21] Appl. No.: 08/771,125

[22] Filed: Dec. 20, 1996

Related U.S. Application Data

[60] Provisional application No. 60/008,930, Dec. 20, 1995.

[51] Int. Cl.[7] .................................................. B60T 11/20
[52] U.S. Cl. .......................... 60/562; 60/568; 29/888.06
[58] Field of Search .............................. 60/533, 562, 568, 60/570; 29/888.06; 92/165 R

[56] References Cited

U.S. PATENT DOCUMENTS

| | | |
|---|---|---|
| 3,013,536 | 12/1961 | Cripe . |
| 3,359,728 | 12/1967 | Torossian . |
| 4,078,386 | 3/1978 | Ewald . |
| 4,114,377 | 9/1978 | Shellhause . |
| 4,132,073 | 1/1979 | Ewald . |
| 4,276,971 | 7/1981 | Horvath ..................................... 92/128 |
| 4,339,989 | 7/1982 | Webster ................................. 92/128 X |
| 4,527,395 | 7/1985 | Gaiser et al. . |
| 4,534,172 | 8/1985 | Price et al. . |
| 4,709,550 | 12/1987 | Sauvée et al. . |
| 5,005,350 | 4/1991 | Reinartz et al. ........................... 60/562 |
| 5,046,316 | 9/1991 | Steffes et al. .............................. 60/562 |
| 5,187,934 | 2/1993 | Mori . |
| 5,203,617 | 4/1993 | Wilde . |
| 5,267,785 | 12/1993 | Maisch . |
| 5,333,946 | 8/1994 | Goossens et al. . |
| 5,364,067 | 11/1994 | Linkner, Jr. . |
| 5,431,014 | 7/1995 | Ishihara . |

FOREIGN PATENT DOCUMENTS

| | | |
|---|---|---|
| 38 10 581 A1 | 3/1988 | Germany . |
| 40 16 755 A1 | 11/1991 | Germany . |
| 43 32 538 A1 | 3/1993 | Germany . |
| 41 42 004 A1 | 6/1993 | Germany . |
| 195 20 679 | 6/1996 | Germany . |
| 195 20 684 | 7/1996 | Germany . |
| 195 20 670 | 8/1996 | Germany . |
| 195 20 680 | 8/1996 | Germany . |
| 195 20 682 | 8/1996 | Germany . |
| 195 36 326 | 8/1996 | Germany . |
| 96/22906 | 8/1996 | Germany . |
| 96/23683 | 8/1996 | Germany . |
| 96/23684 | 8/1996 | Germany . |
| 195 24 626 | 1/1997 | Germany . |

OTHER PUBLICATIONS

Article entitled "Semi–Solid Forming of Aluminum and Magensium" by A.I. Nussbaum, published in "Light Metal Age", Jun. 1996 at pp. 6–22.

*Primary Examiner*—Hoang Nguyen
*Attorney, Agent, or Firm*—MacMillan, Sobanski & Todd, LLC

[57] ABSTRACT

A master cylinder for a vehicle hydraulic brake system, in which the master cylinder includes a body having a stepped bore formed therethrough and at least one piston disposed within the stepped bore. A plug is preferably permanently fixed to one end of the bore providing for a leak tight seal at the end of the bore. The master cylinder preferably includes a spring assembly having a pin with a longitudinally regular end portion which is retained in a bore of the piston.

15 Claims, 5 Drawing Sheets

MASTER CYLINDER HAVING RADIALLY FORMED END PLUGS AND PRESS-FIT CAGED SPRING ASSEMBLY PIN

CROSS-REFERENCE TO RELATED APPLICATIONS

This application claims the benefit of U.S. Provisional application No. 60/008,930, filed Dec. 20, 1995.

BACKGROUND OF THE INVENTION

This invention relates in general to motor vehicle hydraulic brake systems, and in particular to brake master cylinders.

Vehicles having a hydraulic brake system generally have a master cylinder which pressurizes hydraulic fluid within a hydraulic brake circuit to operate the brakes of the vehicle. A master cylinder generally includes a body having a cylindrical bore formed therein. Typically, a master cylinder will contain two (or more) pistons within the cylindrical bore, each pressurizing a separate brake hydraulic circuit connected to certain ones of the brakes on a vehicle, thereby decreasing the possibility of total brake system failure. In a typical tandem (two piston) master cylinder, a primary piston and a secondary piston are disposed within the cylindrical bore. A braking force is input from the brake pedal, through a brake booster if provided, through a rod entering a first axial end of the cylindrical bore which acts against the primary piston. The force is selectively applied to urge the primary piston to pressurize the hydraulic brake fluid in a primary pressure chamber. The primary chamber is in fluid communication with the primary brake hydraulic circuit. A secondary piston forms one wall of the primary pressure chamber, and is thus acted upon by the pressure in the primary pressure chamber. The secondary piston is thus urged by the pressure in the primary pressure chamber to pressurize the hydraulic brake fluid in a secondary pressure chamber. The secondary chamber is in fluid communication with the secondary brake hydraulic circuit.

If the cylindrical bore is formed as a "blind hole", the second axial end of the cylindrical bore is sealed by a portion of the master cylinder body, forming a pressure boundary for the secondary pressure chamber. However, the use of a blind hole can make it somewhat difficult to assemble the internal components of the master cylinder in the cylindrical bore because various shoulders or circumferential grooves may be required to house various components, such as seals.

In static seal master cylinder designs, the seals are held stationary relative to the master cylinder body, and slidingly seal against the movable pistons. Static seals preferably are axially supported within the cylindrical bore to hold them stationary. Although grooves to axially support such static seals can be machined into the wall of the cylindrical bore, this process is generally undesirable due to cost and manufacturing time factors.

To avoid expensive and complex machining operations for forming circumferential grooves within the cylindrical bore for mounting the static seals, it is known to assemble the secondary and primary seals into the bore along with precision machined sleeves which provide the axial support for the seals. These sleeves must be machined with precision to provide free movement and support to the pistons moving therein, and to properly position the seals. The use of sleeves generally increases the cost and the complexity of such master cylinders.

It is also known to form the cylindrical bore as a through bore so as to facilitate machining and assembly of components into the master cylinder. In this design, the second axial end of the cylindrical bore has in the past been sealed with a removable plug. Some prior art master cylinders use a removable plug having an external threaded portion which is threadably engaged with a mating internal threaded portion formed into the second axial end of the cylindrical bore of the body. However, threaded fasteners can cause contamination of the brake fluid because of small metallic particles fracturing from the threaded portions. Additionally, expensive sensitive torque equipment is generally needed to install such threaded plugs. Such removable plug designs have experienced problems with leakage past the plug, and generally increase the axial length of the master cylinder body to provide sufficient material therein to permit machining the threads into the master cylinder body. The length of the master cylinder has in recent years been an important factor in the design of master cylinders because of the tight space constraints of the engine compartment of a vehicle.

Some prior art master cylinders use a caged spring assembly positioned between the primary and secondary pistons. The caged spring assembly generally are caged to a set critical axial length dimension to correctly position the secondary piston relative to a compensation port. The compensation port is a small diameter passageway through the wall of the piston which communicates with a passage through the master cylinder body to the reservoir. The dimension of the axial length of the spring assembly is critical because the primary and secondary pistons have to be precisely positioned in order to allow fluid communication between the reservoir and the primary and secondary pressure chambers, when the master cylinder is inactive. The axial length dimension also has a direct effect on the piston stroke and lost pedal travel.

The caging of the spring is usually done with a circlip or a shoulder screw, and the set axial length dimension is established through a cooperation of several parts, which can result in a large undesirable variation because of the stack-up of tolerances. Another method of assembling the spring cage is to use an axial pin having a threaded end which is threaded into the primary piston a desired distance to set the overall length of the spring assembly. However, the assembly mechanisms which thread the pin onto the primary piston generally are closely monitored during the assembly operation. In prior art designs in which a pin was screwed into the primary piston via a spiral thread, an elaborate structure was required to fix one of the primary piston and the pin, and to rotate (or permit the rotation of) the other of the primary piston and the pin, while simultaneously advancing the two components together. In addition to being relatively elaborate, and therefore expensive, such an assembly method was relatively inaccurate since the final distance of the pin from the piston depends on predicting how far the pin would be screwed in while stopping the relative rotational movement of the pin and piston, and variations in friction encountered during the coast down period after the rotational drive is shut off. Additionally, damage to the component which is secured against rotation could occur if the component slips within its restraints.

BRIEF SUMMARY OF THE INVENTION

This invention relates to motor vehicle hydraulic brake systems, and in particular to brake master cylinders. The master cylinder of the present invention may be formed with a through-bore design, so that the cylindrical bore is open at both ends of the master cylinder body prior to the assembly operation. The present invention allows for assembly of the secondary cup and wiper seals without the use of precision machined sleeves within the cylindrical bore to provide axial support. One feature of the invention is the use of radially forming operations at each end of the master cylinder body to retain the internal components. A portion of the master cylinder body is radially formed to form a flange extending radially inwardly into the bore of the master cylinder body. The flange cooperates with a shoulder formed within the bore to permanently fix a plug to the master cylinder body.

In another embodiment of the invention, the master cylinder includes at least one caged spring assembly positioned between a primary piston and a secondary piston. The spring assembly includes a pin having a longitudinally regular end portion which is pressed straight into a hole formed in the primary piston to fasten the spring assembly to the primary piston with a press fit. The spring assembly returns the primary piston to an inactive position after force from the brake pedal has removed from the primary piston.

The inventive method of attaching the fluted pin to the piston uses a straight-in motion, with no relative rotation between the pin and the piston. The pin attachment is accomplished by means of an assembly fixture which accurately positions the pin within the bore of the piston, so that an accurate length of the spring assembly from the edge of the piston wall can be obtained.

In yet another embodiment of the invention, the master cylinder includes stepped bore having a first diameter portion and a second diameter portion, wherein the second diameter portion has a smaller inside diameter than the first diameter portion, thereby forming a shoulder. The master cylinder also includes a piston having a flange extending radially outwardly therefrom. The piston is mounted in the stepped bore for reciprocating movement therein so that the flange extending form the piston is prevented from moving past the shoulder. In a specific embodiment, the flange is a "C-clip" retained in a circumferential groove formed in the piston.

Various objects and advantages of this invention will become apparent to those skilled in the art from the following detailed description of the preferred embodiment when read in light of the accompanying drawings.

DETAILED DESCRIPTION OF THE INVENTION

Figure 1:
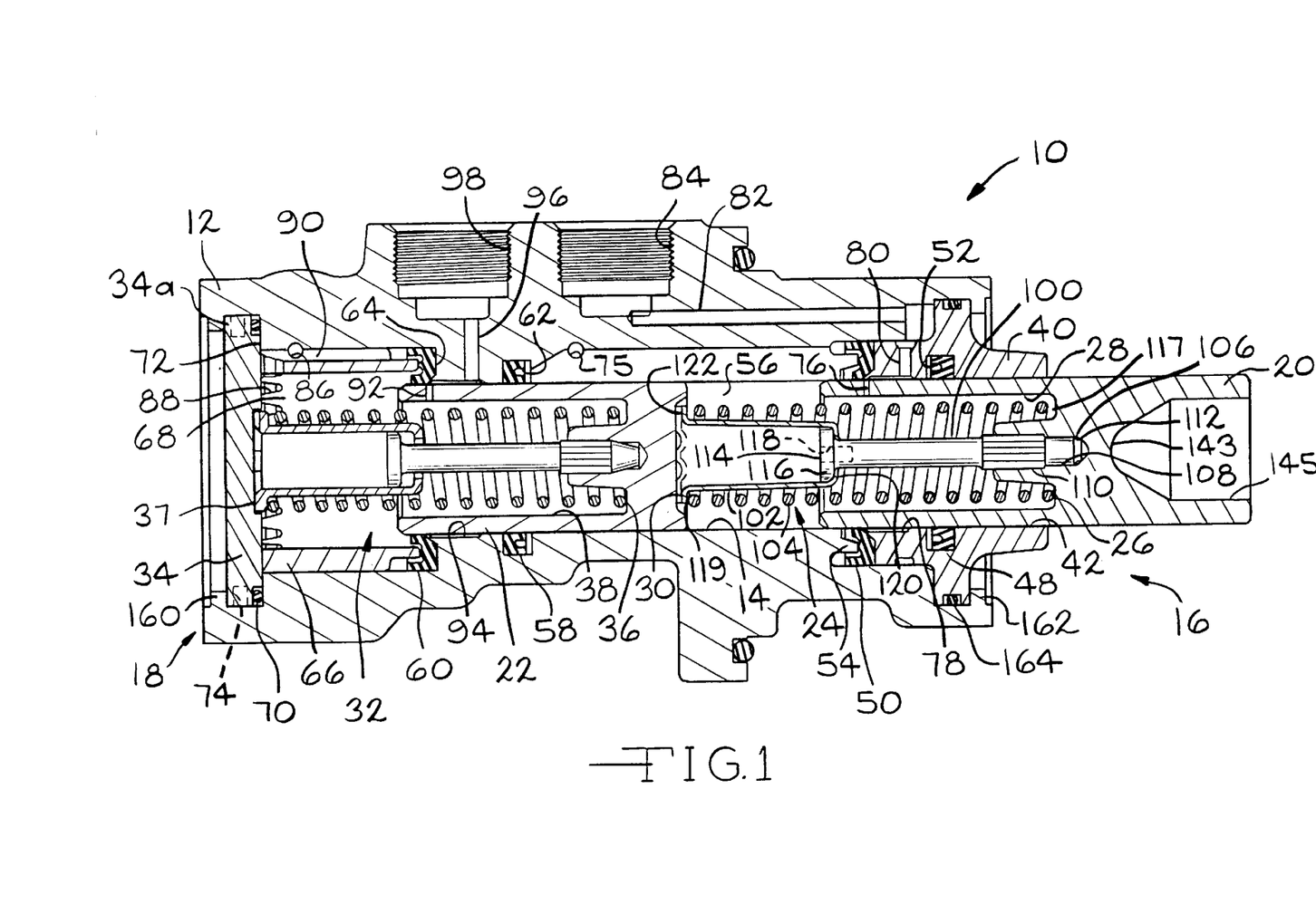
FIG. 1 is a sectional view of a first embodiment of a master cylinder in accordance with this invention.

Referring now to the drawings, there is illustrated in FIG. 1 a first embodiment of a master cylinder, generally indicated at 10, in accordance with the invention. The master cylinder 10 has a body 12 having a stepped cylindrical through bore 14. The bore 14 has first and second ends, 16 and 18, which are open. The body 12 can be made of any suitable material, such as aluminum, and is preferably formed by a semi-solid forging process to increase the ductility and strength properties of the body 12. Of course, the body 12 can be manufactured using any suitable process. To decrease the manufacturing time of the master cylinder 10, the cylindrical walls of the stepped bore 14 can be machined by a pair of cutting tools (not shown), a first one entering from the first end 16 and second one entering from second end 18, thereby forming the single though bore 14. The pair of cutting tools can be simultaneously operated to machine the walls of the bore 14 to decrease the manufacturing time.

The master cylinder 10 further includes a primary piston 20 and a secondary piston 22. The primary and secondary pistons 20 and 22 may formed of a suitable material, such as aluminum. The pistons 20 and 22 are provided with a smooth outer cylindrical surface, such as that attained by a roller burnishing process. Aluminum primary and secondary pistons 20 and 22 are preferably anodized after burnishing.

Positioned between the primary piston 20 and the secondary piston 22 is a caged primary spring assembly 24 having first and second ends 26 and 30, respectively. The first end 26 of the primary spring assembly 24 is disposed within a spring housing bore 28 formed in the primary piston 20. The second end 30 of the primary spring assembly 24 abuts against the secondary piston 22. A caged secondary spring assembly 32 having first and second ends 36 and 37, respectively is positioned between the secondary piston 22 and an end plug 34. The end plug 34 is permanently fastened to the body 12 in the second end 18 of the bore 14, as will be further explained in detail below. The body 12 and the end plug 34 cooperate to form a master cylinder housing. The first end 36 of the secondary spring assembly 32 is disposed within a spring housing bore 38 formed in the secondary piston 22. The second end 37 of the secondary spring assembly 32 abuts against the end plug 34. The master cylinder 10 further includes a primary seal land 40 having a through hole 42. The primary piston 20 is partially disposed within the through hole 42 of the primary seal land 40.

The primary piston 20 is slidingly sealed to the cylindrical wall of the through hole 42 of the primary seal land 40 by a primary wiper seal 48 and a primary cup seal 50. The primary wiper seal 48 is seated within a circumferential groove 52 formed in the primary seal land 40. The primary cup seal 50 is retained between the primary seal land 40 and a shoulder 54 formed in the bore 14 of the body 12. A primary pressure chamber 56 is generally defined by cooperation of the primary cup seal 50, the primary piston 20, a central portion of the bore 14 in the body 12, and the right-hand end of the secondary piston 22, as viewed in FIG. 1.

The secondary piston 22 is slidingly sealed to the cylindrical wall of the bore 14 of the body 12 by a secondary wiper seal 58 and a secondary cup seal 60. The secondary wiper seal 58 is seated within a circumferential groove 62 formed in the wall of the bore 14. The secondary cup seal 60 is retained between a shoulder 64 formed in the bore 14 of the body 12 and a retaining sleeve 66 disposed within the second end 18 of the bore 14. A secondary chamber 68 is generally defined by the cooperation of the secondary cup seal 60, the secondary piston 22, a portion of the bore 14 of the second end 18 thereof, and the end plug 34. If required, a seal 70 can be used to help provide for a leak tight sealing engagement between the end plug 34 and the body 12. Although the seal 70, as shown in FIG. 1, is positioned between a shoulder 72 formed in the body 12 and a circumferential extending perimeter portion 34a of the end plug 34, the seal 70 can be located in any suitable position, such as in an outer circumferential groove, as indicated by the phantom lines 74 formed in the end plug 34.

The primary and secondary cup seals 50 and 60, the primary wiper seal 48, the secondary wiper seal 58, the seal 70, and all other seals described herein, can be any suitable seal structure, such as a cup seal, lip seal, or O-ring, and can be made of any suitable material such as an elastomeric material.

The primary chamber 56 is in fluid communication with a primary outlet port 75 which is in fluid communication with a primary hydraulic brake circuit (not shown). The primary brake hydraulic brake circuit is in fluid communication with at least one wheel brake (not shown) of the vehicle in which the master cylinder 10 is installed. The primary piston 20 has at least one radially extending compensation port 76 formed through the wall of the primary piston 20. Preferably, the primary piston 20 has a plurality of compensation ports 76. The compensation ports 76 are in fluid communication with a circumferential groove 78 formed on the inner surface of the primary seal land 40. The groove 78 is in fluid communication with a passageway 80 extending radially through the wall of the primary seal land 40. The passageway 80 is in fluid communication with a passageway 82 formed through the body 12, which is, in turn, in fluid communication with an inlet port 84. The inlet port 84 is in fluid communication with a fluid reservoir (not shown) which stores a supply of hydraulic fluid for the brake system.

The portion of the secondary chamber 68 within the retaining sleeve 66 is in fluid communication with a secondary outlet port 86 via a plurality of notches 88 and a longitudinal groove 90 formed in the retaining sleeve 66. The outlet port 86 is in fluid communication with a secondary hydraulic brake circuit (not shown) which is in fluid communication with at least one wheel brake (not shown). Preferably, the secondary piston has a plurality of radially extending compensation ports 92 formed through the wall of the secondary piston 22. The compensation ports 76 of the primary piston 20 and the compensation ports 92 in the secondary piston 22 can be formed by any suitable method, such as by laser drilling. The compensation ports 92 are in fluid communication with a circumferential groove 94 formed on the inner surface of a portion of the cylindrical wall of the bore 14. The groove 94 is in fluid communication with a passageway 96 formed through the body 12. The passageway 96 is in fluid communication with an inlet port 98 which is in fluid communication with the fluid reservoir.

The primary spring assembly 24 generally includes three components: a pin 100, a retainer 102, and a helical spring 104. The pin 100 has a first end 106 which is retained within a longitudinal central bore 108 formed in the primary piston 22. The first end 106 is fastened to the primary piston 22 in a fixed position relative thereto, such as by a frictional engagement with the central bore 108. Preferably, the first end 106 has a longitudinally regular shape. The term longitudinally regular, as applied to the first end 106 or the bore 108 means that a rotational torque is not induced when the pin 100 is pressed straight into the bore 108 in the piston 22 as described in a preferred assembly method described below. For example, an end of a pin forming a single helical screw thread is not longitudinally regular. Examples of longitudinally regular surfaces are smooth cylindrical surfaces, longitudinally extending flutes or circumferential lands, grooves, or stippled, knurled, or other similar surface features. Similar longitudinal regular features may be formed on the longitudinally regular wall of the bore 108. Further more, if desired, longitudinal regular features may be formed at both the first end 106 and the bore 108.

As shown in FIG. 1, the first end 106 of the pin 100 is comprised of a plurality of straight flutes 110 formed therein. The flutes extend longitudinally along the shaft of the pin 100 and extend radially outwardly from the pin 100. Note that the flutes 110 allow for a relatively great tolerance in the diameter of the pin 100 and the diameter of the central bore 108 in the primary piston 22 while still achieving a satisfactory connection between the pin 100 and the piston 22, when assembled according to the method of the invention as described below. Preferably, the first end 106 of the pin 100 also includes a pilot portion 112 at the end of the pin 100 so that the pin 100 can be easily aligned and inserted into the central bore 108 of the primary piston 20 during assembly.

Figure 1A:
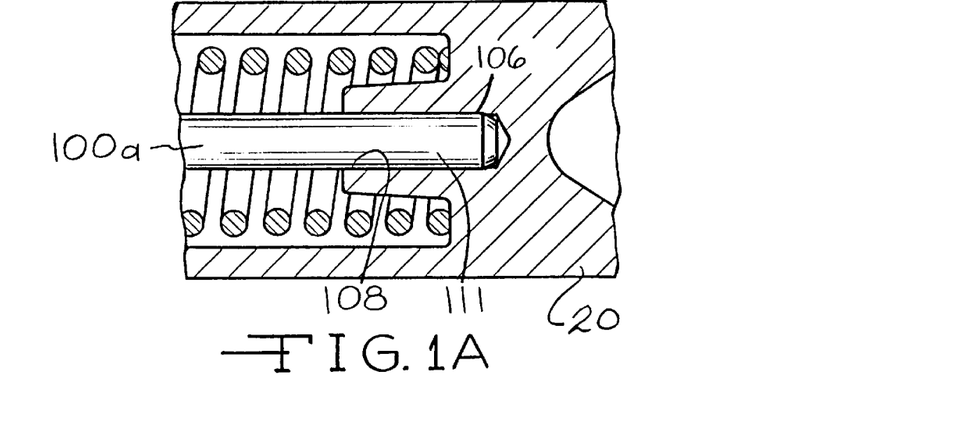
FIG. 1A is an enlarged cross-sectional view of a portion of the primary piston illustrating an alternate embodiment of a pin of the spring assembly having an end with a smooth cylindrical outer surface engaged with the central bore formed in the primary piston.

FIG. 1A illustrates an alternate embodiment of a pin 100a having a first end 106a which has a smooth cylindrical outer surface 111. The pin 100a is press-fit straight into the central bore 108 of the primary piston 20. The diameters of the pin and the bore preferably are closely controlled in order to consistently achieve adequate pull-out resistance and reasonable insertion forces. The cylindrical wall of the central bore 108 can be any suitable texture, such smooth (as shown in FIG. 1A), stippled, knurled, or fluted such as that shown in FIG. 1B.

Figure 1B:
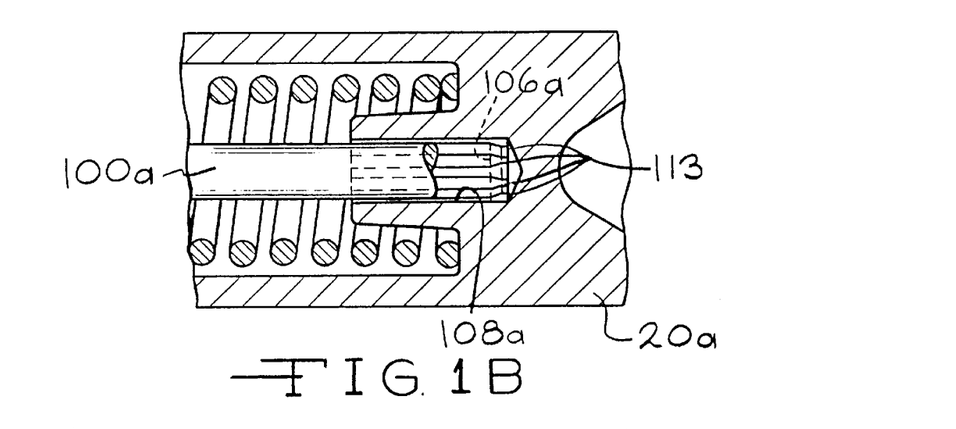
FIG. 1B is an enlarged cross-sectional view of an alternate embodiment of a portion of a primary piston in which a pin of the spring assembly is engaged with a central bore of the primary piston, wherein the central bore has a plurality of longitudinally extending flutes.

FIG. 1B illustrates an alternate embodiment of a central bore 108a formed in a primary piston 20a. The pin 100a is shown partially broken away for clarity with the first end 106a shown in phantom lines. The central bore 108a has a plurality of straight flutes 113 formed therein. The flutes 113 extend longitudinally along the central bore 108a and extend radially inwardly into the central bore 108a. The pin 100a has a smooth cylindrical end 106a and is press-fit straight into the central bore 108a of the primary piston 20a, resulting in a deformation the flutes 113. Such an arrangement is believed to provide adequate pull-out resistance, and reasonable insertion forces, while permitting the use of components with less tight tolerances in radial dimensions than the smooth cylindrical pin 100a and the smooth bore 108 shown in FIG. 1A.

Figure 1C:
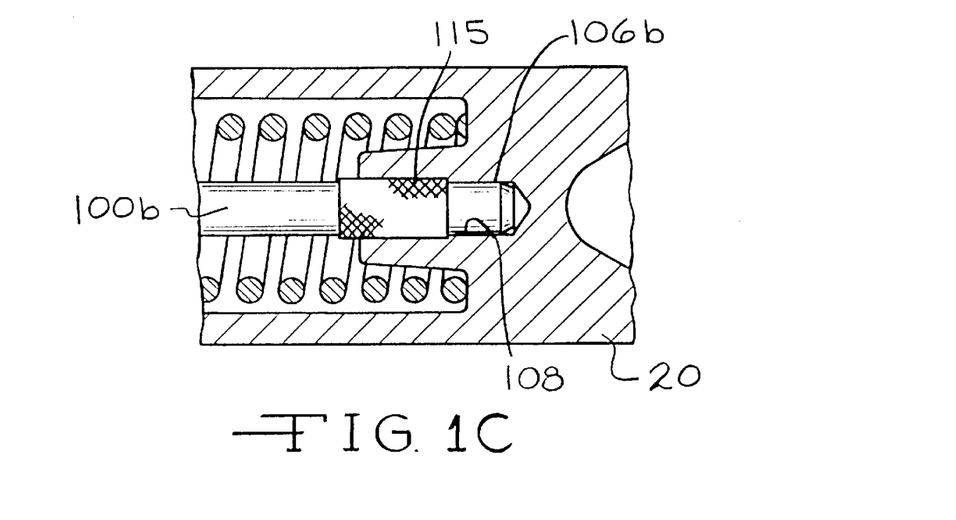
FIG. 1C is an enlarged cross-sectional view of a portion of the primary piston illustrating another embodiment of in which a pin of the spring assembly has an end with a knurled outer surface being frictionally engaged with a central bore formed in the primary piston.

FIG. 1C illustrates another alternate embodiment of a pin 100b having a first end 106b which has a knurled outer surface 115. The pin 100b is press-fit straight into the central bore 108 of the primary piston 20.

Tests performed on samples of one suitable design have shown that the connection between the pin 100 and the primary piston 20 can withstand a pull of hundreds of pounds of force, while the pin 100 is expected to be subjected to only several tens of pounds of pull force in the master cylinder 10. Thus, the press fit design of this invention is more than adequate for the forces acting on the first end 106 of the pin 100 during normal operation of the master cylinder 100.

The pin 100 has a second end 114 having a shouldered head 116. An axially extending recess 118 is formed along the axis of the pin through the head 116, for a purpose which will be described below. The spring 104 bears against, and is thus operatively coupled at a first end 117 to, the primary piston 20. The spring 104 is operatively coupled at a second end 119, through the retainer 102, to the end of the pin 100 having the head 116. The radially outwardly extending head 116 of the pin 100 retains a radially inwardly extending flanged end 120 located at one end of the retainer 102. The other end of the retainer 102 has a radially outwardly extending flanged end 122 which retains the second end 119 of the spring 104.

When the primary piston 20 is urged relatively toward the secondary piston 22, the spring 104 is compressed therebetween. As the spring 104 is compressed, the retainer 102 is moved, together with the second end 119 of the spring 104, along the pin 100 toward the primary piston 20. Thus, the second end 119 of the spring 104 is moveable relative to the pin 100 between the illustrated extended position, which is fixed relative to the pin 100, and a compressed position located between the extended position and the primary piston 20. The secondary spring assembly 32 is similar in structure and function to that of the primary spring assembly 24, and will, therefore, not be discussed in detail. Note that a helical spring (not shown) can be used in the master cylinder 10 in place of the secondary spring assembly 32. The caged secondary spring assembly 32, however, provides for convenience in disassembly of the master cylinder 10, by limiting displacement of the primary piston 20 and other internal components when the restraint of the primary seal land 40 is removed.

In prior art designs in which a pin was screwed into the primary piston with a spiral thread, an elaborate structure was required to fix one of the primary piston and the pin, and to rotate (or permit the rotation of) the other of the primary piston and the pin, while simultaneously advancing the two components relatively together. In addition to being relatively elaborate, and therefore expensive, such an assembly method was relatively inaccurate as described above, since the final distance of the head of the pin from the piston depends on when the relative rotational movement is stopped, and variations in friction encountered during the coast down period after the rotational drive is shut off can prevent consistent assembly. Additionally, damage to the component which is secured against rotation could occur if the component slips within its restraints. The assembly method of the present invention uses a straight-in motion, with no relative rotation between the pin and the piston. The present invention therefore is effective at overcoming the drawbacks of the prior art.

To assemble the master cylinder 10, the primary and secondary spring assemblies 24 and 32 are fastened to the primary and secondary pistons 20 and 22, respectively. The method of fastening the primary and secondary spring assemblies 24 and 32 are generally the same, and therefore, only a detailed description of the method of assembling the primary spring assembly 24 will be given.

Figure 2:
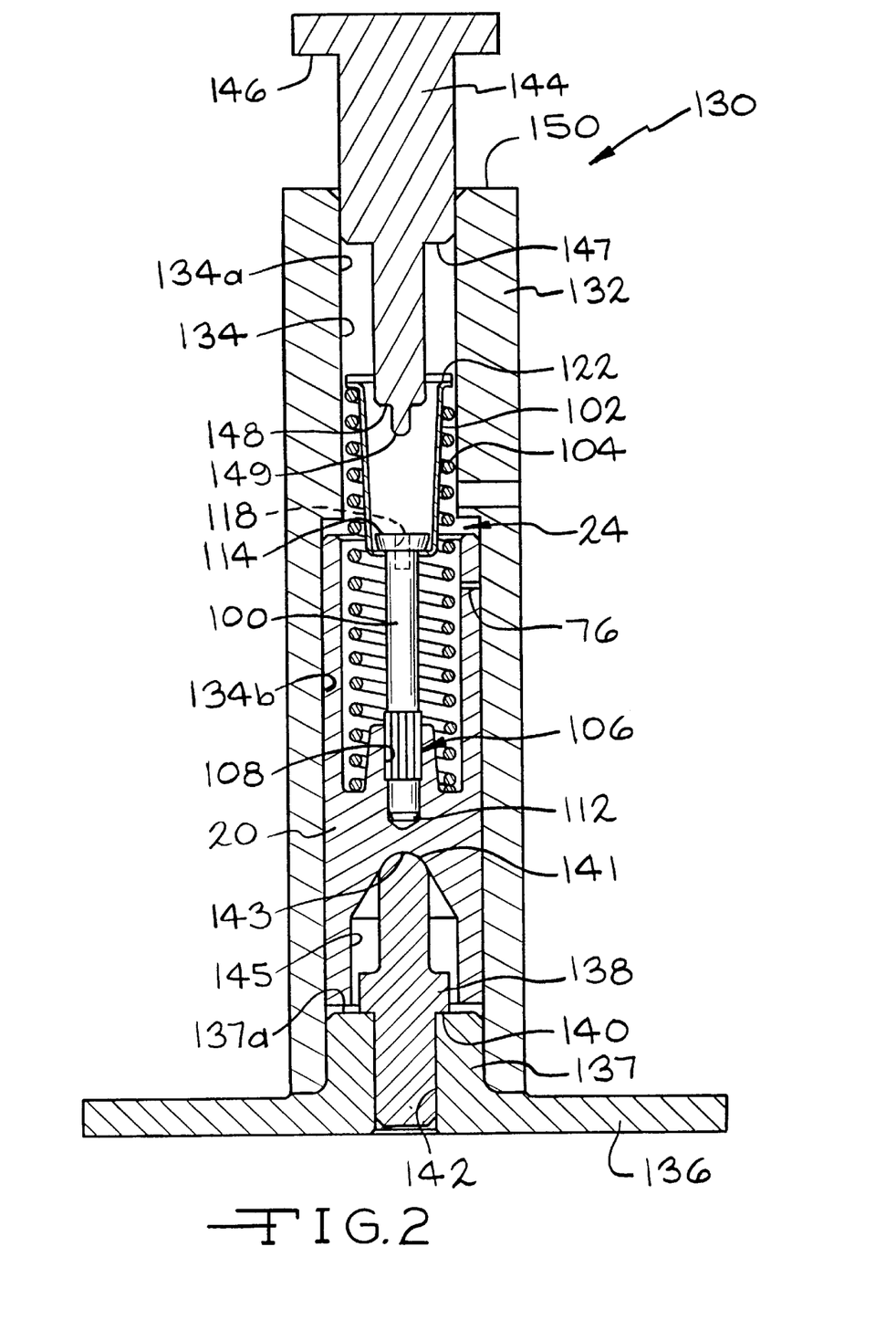
FIG. 2 is sectional view of an assembly fixture utilizing the method of the present invention in which the end fluted pin is accurately press fitted into the piston.

The fluted pin 100 of the present invention can be easily and accurately driven into the primary piston 20 by means of an assembly fixture 130, illustrated in FIG. 2. The assembly fixture 130 is comprised of a guide tube 132 having an axial bore 134. The bore 134 has an upper portion 134a and lower portion 134b. Preferably, the upper portion 134a is of reduced diameter compared to the lower portion 134b, to facilitate accurate guidance of components of different diameters, as will be described below. However, the upper portion 134a need not be of reduced diameter compared to the lower portion 134b. The guide tube 132 is supported upright by a base plate 136 having a cylindrical extension 137 which removably extends axially into the lower portion 134b of the bore 134 of the guide tube 132. The extension 137 has a radially extending flat surface 137a. The assembly fixture 130 is further comprised of an adjustment pin 138 having a shoulder 140. The adjustment pin 138 further includes a rounded tip 141. The adjustment pin 138 is placed in an axial hole 142 in the base extension 137 so that the shoulder 140 rests on the end surface 137a of the base extension 137. Preferably, the adjustment pin 138 is easily replaceable to permit quick replacement of the adjustment pin 138 in case of wear, which can alter the dimensions of the assembly fixture 130, or if the assembly fixture 130 is to be used to set the pins of caged spring assemblies having different overall lengths.

To accurately press fit the pin 100 of the spring assembly 24 into the central bore 108 of the primary piston 20, the appropriately sized adjustment pin 138 is assembled onto the plate 136. The primary piston 20 is placed in the assembly fixture 130 so that the rounded tip 141 of the adjustment pin 138 contacts an end surface 143 of an axial bore 145 in the primary piston 20. When the primary piston 20 is subsequently installed in the master cylinder 10, the end surface 143 of the primary piston 20 is the contact surface of an input rod (not shown) which is linked to the brake pedal. Note that while the tip 141 of the adjustment pin 138 and the end surface 143 of the primary piston 20 are shown as rounded, it will be understood that they may be of other shapes such as flattened or conical, and the adjustment pin 138 may be easily exchanged for an adjustment pin of the appropriate shape to fit the primary piston 20.

The constituent components of the primary spring assembly 24 are then fitted onto the primary piston 20. The spring 104 is inserted first, followed by the retainer 102, and finally by the pin 100, which is inserted through an opening in the flanged end 122 of the retainer 102, and aligned with the central bore 108 in the primary piston 20.

Next, the guide tube 132 is assembled onto the plate 126, about the components of the primary spring assembly 24. The reduced diameter upper portion 134a of the bore 134 radially supports the upper end of the spring 104. The enlarged diameter lower portion 134b of the bore 134 accurately aligns the primary piston 20 to the longitudinal axis of the bore 134.

A stepped cylindrical plunger 144 is provided which has a first shoulder 146, a second shoulder 147, an end face 148 and a guide pin 149 extending axially from the end face 148. The plunger 144 is inserted into the axial bore 134 until the second shoulder 147 rests against the retainer 102, or until the guide pin 149 enters the recess 118 of the pin 100 and the end face 148 bears against the second end 114 of the pin 100, whichever occurs first. The plunger 144 is then pushed downward until the first shoulder 146 of the plunger rests against a top surface 150 of the guide tube 132. The movement of the plunger 144 causes the lower end face 148 of the plunger 144 to drive the first end 106 of the pin 100 into the central bore 108 of the primary piston 20. As the plunger 144 is depressed, if the guide pin 149 is not already located within the recess 118 of the pin 100, the guide pin 149 is moved into the recess 118 and the end face 148 bears against the upper end of the pin 100, pushing the pin 100 downwardly. The plunger 144 is accurately aligned by the central section thereof between the shoulders 146 and 147, to ensure the guide pin 149 is centered in the bore 134. The guide pin 149 slides into the recess 118 in the pin 100 to center the pin 100 in the bore 134, allowing the pilot portion 112 of the pin 100 to easily find and enter the central bore 108. Preferably, the pilot portion 112 is somewhat tapered to further aid in guiding the pin 100 into the central bore 108.

Accuracy of the insertion of the pin 100 can easily be established by machining the assembly fixture 130 to very tight tolerances. Thus, the components of the primary piston 20 and the primary spring assembly 24 generally do not need to be machined to as tight tolerances as in the past, because the accuracy of the overall length of the primary piston 20 and primary spring assembly 24 is established by the assembly fixture 130.

Referring again to FIG. 1, to assemble the master cylinder 10 the secondary wiper seal 58 and the secondary cup seal 60 are installed through the open second end 18 of the stepped bore 14. Note that this is prior to the step of fastening the end plug 34 to the body 12 of the master cylinder 10. Then, the seal 70 (if used) and the end plug 34 are positioned so as to close off the second end 18 of the bore 14. Preferably, the end plug 34 is then permanently fixed in the bore 14.

The end plug 34 can be permanently fixed in the bore 14 by deforming the body 12 about the second end 18 of the bore 14 to form a radially inwardly extending flange 160. The flange 160 can be formed by any suitable process, such as by radially forming or swaging the body 12 about the circumference of the second end 18 of the bore 14. The flange 160 cooperates with the shoulder 72 to permanently retain the circumferential extending perimeter portion 34a of the end plug 34 in the bore 14, such that the flange 160 or other part of the body 12, or the end plug 34 would have to be destroyed or permanently deformed to remove the end plug 34 from the bore 14. The flange 160 can be comprised of a plurality of sections or projections, but preferably forms a circumferentially uniform flange at the second end 18, or by any other suitable structures formed from the body 12. The end plug 34, which is thus fixed relative to the body 12, cooperates with the sleeve retainer 66 and the shoulder 64 in the bore 14 to axially support the secondary cup seal 60.

The end plug 34 can also be permanently fixed in the bore 14 by welding the end plug 34 to the body 12 by a suitable welding process, such as by an electron beam welding process, thereby permanently plugging the bore 14 with a leak-tight seal. Since a leak-tight seal is formed, the seal 70 may be eliminated.

The end plug 34 may also be retained and held in place in the bore 14 by a snap-ring (not shown) engaging a circumferential groove (not shown) formed in the bore 14 at the second end 18 thereof After the second end 18 of the master cylinder body 12 has been closed off and sealed, the secondary piston 22 and the mounted secondary spring assembly 42 are inserted through the open first end 16 of the bore 14. The primary cup seal 50, the primary seal land 40, and the primary wiper seal 48 are also installed through the open first end 16 of the bore 14. The primary piston 20 and the mounted primary spring assembly 24 are then installed through the opening 42 in the primary seal land 40 into the bore 14.

The primary seal land 40 is then retained in the first end of the bore 14 of the body 12 by any suitable retaining means, such as by electron beam welding or by radially forming a flange 162, as described above with respect to the flange 160. The primary seal land 40 may also be retained in the bore 14 by a snap-ring (not shown) engaging a circumferential groove (not shown) formed in the bore 14 at the second end 16 thereof. If desired, the master cylinder 10 can include a seal 164 to seal off the outer edge of the primary seal land 40 with the bore 14 of the body 12. The primary seal land 40 cooperates with the shoulder 54 in the bore 14 to provide axial support for the primary cup seal 50.

When the master cylinder 10 is in the inactive condition, the force input from the brake pedal is removed from the primary piston 20, and the primary piston 20 and the secondary piston 22 are in their fully retracted positions, as shown in FIG. 1. In the inactive condition, the primary pressure chamber 56 communicates with the reservoir via the compensation ports 76, the groove 78, the passageway 80 in the primary seal land 40, the passageway 82 in the body 12, and the inlet port 84. Likewise, the secondary pressure chamber 68 communicates with the reservoir via the compensation ports 92, the groove 94, the passageway 96 in the body 12, and the inlet port 98.

When the vehicle driver applies force to the brake pedal, the primary piston 20 is moved leftward, as shown in FIG. 1, by the input rod (not shown). The movement of the primary piston 20 causes the communication between the reservoir and the pressure chamber 56 to be cut off as the result of the compensation ports 76 moving past the primary cup seal 50. The fluid in pressure chamber 56 is pressurized and flows out through the outlet port 75 which is connected to the first brake circuit and the associated wheel brake(s). The movement of the primary piston 20 increases the pressure in the primary pressure chamber 56, which pushes the secondary piston 22 out of the retracted position thereof. The communication between the reservoir and the secondary pressure chamber 68 is cut then off by the compensation ports 92 moving past the secondary cup seal 60. The movement of the secondary piston 20 pressurizes the fluid in the secondary pressure chamber 74 and the brake fluid flows out through the outlet port 86 to the second brake circuit and the associated wheel brake(s).

When the brake pedal is released, the primary and secondary pistons 20 and 22 are urged rightward by the compressed spring assemblies 24 and 32, respectively, and fluid from the wheel brakes is returned to the primary and secondary pressure chambers 56 and 68. The primary and secondary pressure chambers 56 and 68 are then in communication with the reservoir to compensate for any volumetric changes due to such factors as brake lining wear, leakage, or fluid temperature change.

To accurately align the compensation ports 76 and 92 with the primary and secondary cup seals 48 and 60, respectively, the primary spring assembly 24 is preferably fastened to the primary piston 20, by the method described above. The primary spring assembly 24 is fastened so that the end 30 of the primary spring assembly 24 extends from the primary piston 20 at a predetermined distance. When the master cylinder 10 is in an unactuated position, as shown in FIG. 1, the spring 104 of the primary spring assembly 24 urges the shouldered head 116 of the pin 100 against the flanged end 120 of the retainer 102. The end 37 of the spring assembly 32, however, does not need to be at such a precise distance away from the secondary piston 22. The secondary spring assembly 32 has a weaker spring than the spring 104 of the spring assembly 24, and is preferably slightly compressed when the primary and secondary pistons 24 and 32 are in their normal unactuated position, as shown in FIG. 1. The secondary spring assembly 32 is preferably slightly compressed so that minor adjustments can be made in positioning the primary and secondary pistons 20 and 22 and the spring assembly 24 when the input rod from the brake pedal is connected to the primary piston 20. Since the secondary spring assembly 32 is slightly compressed when the master cylinder 10 is assembled, the secondary spring assembly 32 will urge the secondary piston 32 and the primary piston 24 fully rightward (as viewed in FIG. 1) to the proper retracted position. The spring assembly 32 can be replaced with a conventional helical compression spring, if desired. However, a caged spring assembly 32 is preferred for ease of assembly and disassembly of the master cylinder 10.

Note that although the master cylinder 10 was described as a tandem (two piston) master cylinder, it will be appreciated by those of ordinary skill in the art that the general principals of this invention could obviously be applied to master cylinders having only one, or more than two pistons contained therein. Note also that the term master cylinder, as used herein, generally refers to the entire assembly of a brake master cylinder body formed with a bore formed therein, along with any pistons, seals, springs, and other components commonly contained therein.

Figure 3:
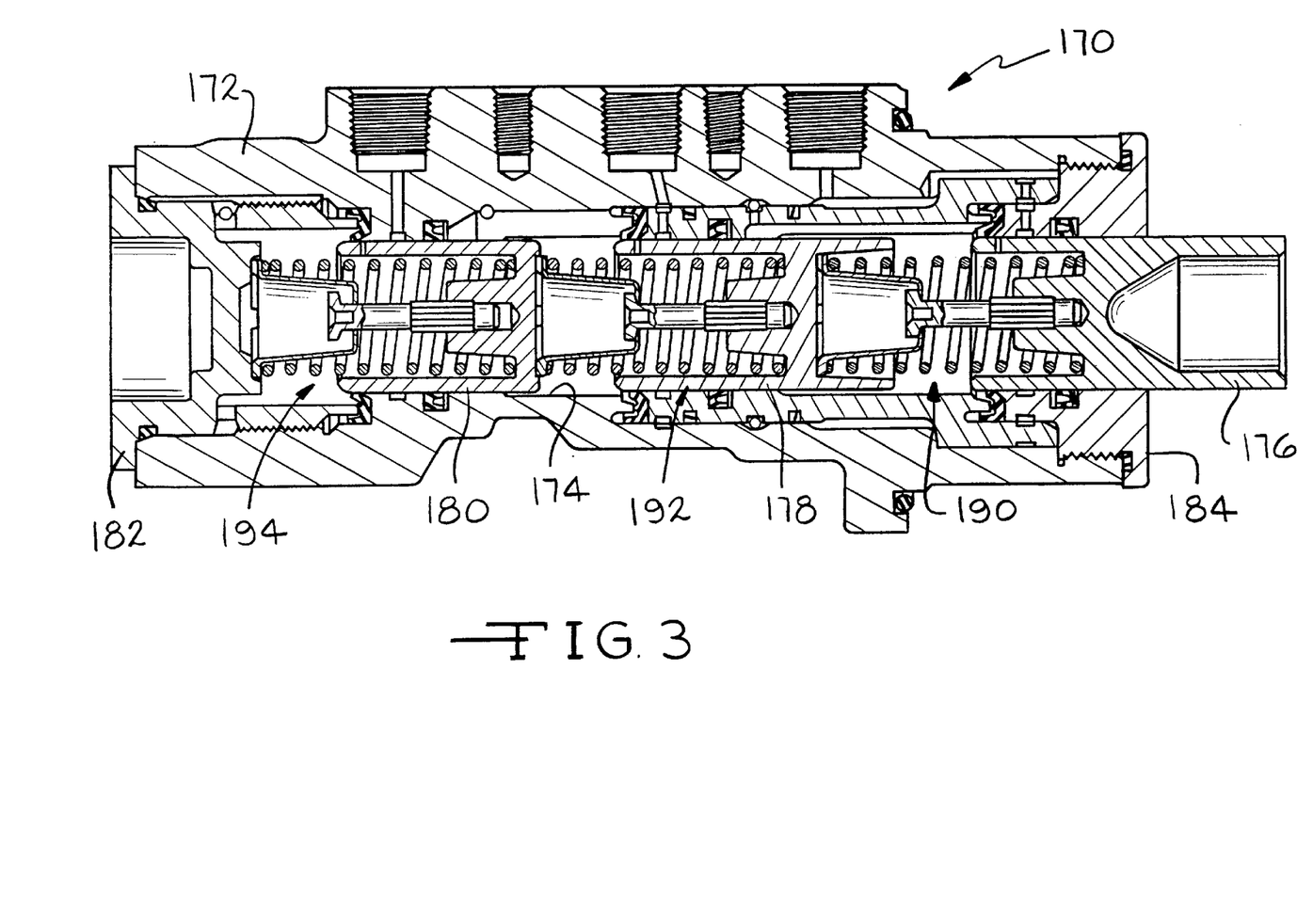
FIG. 3 is a sectional view of a second embodiment of a master cylinder in accordance with this invention.

There is illustrated in FIG. 3 a second embodiment of a master brake cylinder of the present invention, indicated generally at 170. The master cylinder 170 is a three-chambered master cylinder which functions generally in the same manner as the tandem master cylinder 10 of FIG. 1. The three-chambered master cylinder 170 has a body 172 and a stepped through bore 174. The master cylinder 170 includes first, second, and third pistons, 176, 178, and 180, respectively. The ends of the bore 174 are closed off by threaded end plugs 182 and 184. The master cylinder 170 also includes three caged spring assemblies 190, 192, and 194 which are fastened to the first, second, and third pistons 176, 178, and 180, respectively. The spring assemblies 190, 192, and 194 have end fluted pins which are press fitted into the associated pistons by the method described above with respect to FIG. 2, or other suitable method, so that the pistons 178 and 180 are positioned accurately within the bore 174 when the master cylinder 170 is inactive. Note that, as with the first embodiment, the leftmost caged spring assembly 194 (as viewed in FIG. 3) has a weaker spring than the spring assemblies 192 and 190, and is slightly compressed when the pistons 176, 178, and 180 are in their normal unactuated position.

Figure 4:
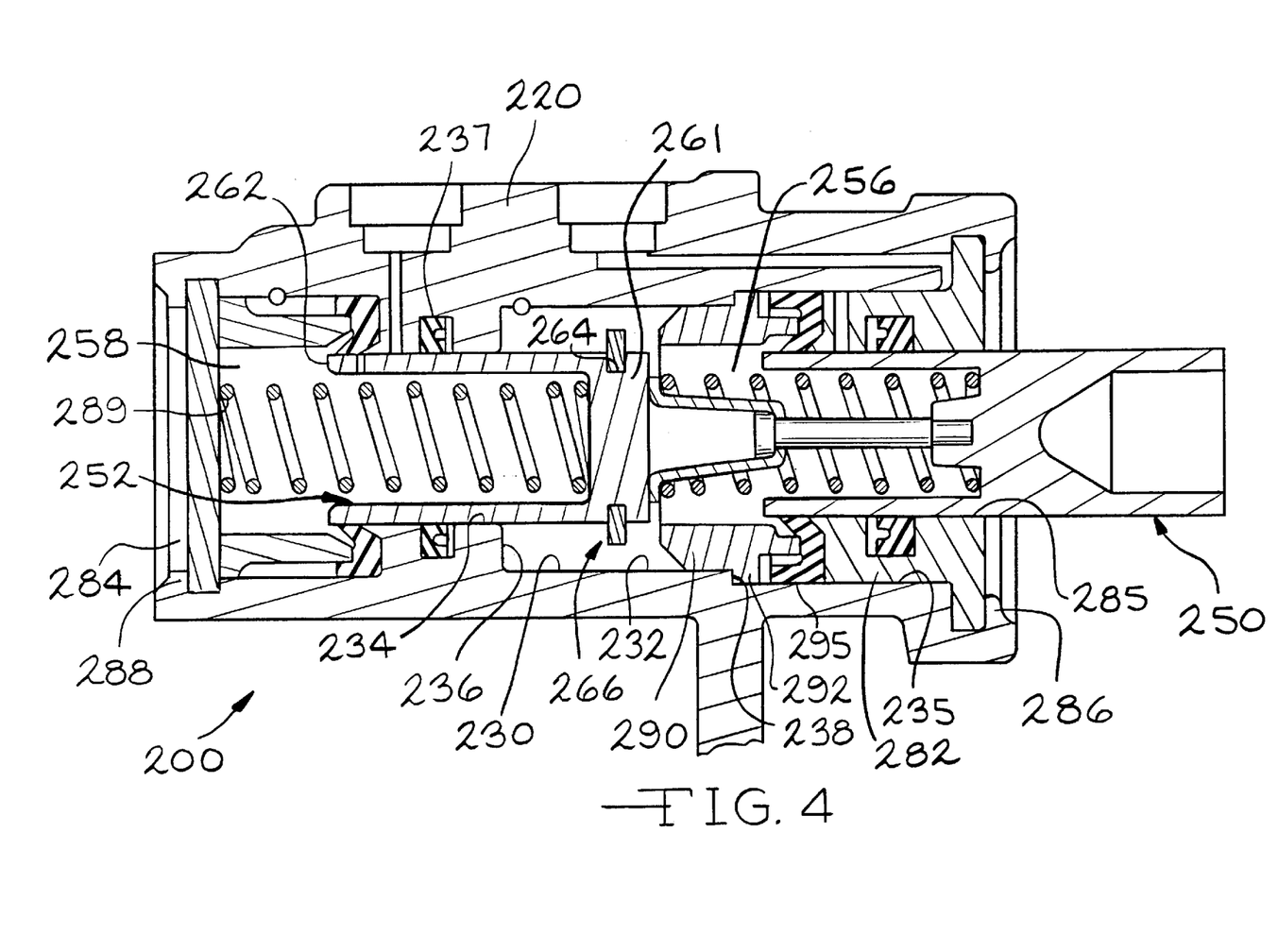
FIG. 4 is a sectional view of a third embodiment of a master cylinder in accordance with this invention.

There is illustrated in FIG. 4 a third embodiment of a master brake cylinder of the present invention, indicated generally at 200. The master cylinder 200 is a tandem master cylinder which functions generally in the same manner as the master cylinders 10 and 170. The master cylinder 200 has a body 220 and a stepped through bore 230. The bore 230 has a first portion 232, a second portion 234, and a third portion 235. The first portion 232 of the bore 230 has a first inside diameter which is larger than the inside diameter of the second portion 234 of the bore 230. A shoulder or stop 236 is formed between the first portion 232 of the bore 230 and the second portion 234 of the bore 230. The second portion 234 of the bore 230 is formed with a circumferentially extending groove, within which is seated a secondary wiper seal 237. The inside diameter of the third portion 235 is greater than the inside diameter of the first portion 232, and a second shoulder 238 is formed between the first portion 232 and the third portion 235.

The master cylinder 200 further includes primary and secondary pistons 250 and 252, respectively, which cooperate with the body 220 to define a primary chamber 256 and a secondary chamber 258. The primary piston 250 is similar to the primary pistons described above. The secondary piston 252 has a first end 261 and a second end 262, with the first end 261 being positioned closer to the primary piston 250 than the second end 262. The first end 261 has a circumferentially extending groove 264 formed therein. A "C" clip 266, which is an arcuate metal band having the general shape of the letter "C", is seated in the groove 264, and resiliently engages the secondary piston 252 to remain in the groove 264. The clip 266 extends radially outwardly from the groove 264 to form a radially outwardly extending flange on the first end 261 of the secondary piston 252. The secondary piston 252 may suitably be provided with an outwardly extending flange on the first end 261, rather than the clip 266 and the groove 264. For example, a split ring extending completely around the secondary piston 252 may be used in place of the clip 266. Furthermore, the secondary piston 252 may be integrally formed with a flange on the first end 261, such as by casting or forging, or the second end 262 may be machined to be of smaller outer diameter than the first end 261. As a further, non-limiting example of how the secondary piston 252 may be provided with a radially outwardly extending flange, the flange may be formed by providing threads on the outer surface of the first end 261 and screwing on an annular threaded ring or threaded cap to form the flange on the first end 261.

The open ends of the bore 230 are closed off by end plugs 282 and 284. The end plug 282 is provided with a central opening 285 through which the primary piston 250 extends. The end plugs 282 and 284 are retained by respective inwardly extending flanges 286 and 288, which are radially formed from the body 220, as described above.

A spring 289 is disposed between the end plug 284 and the secondary piston 252. The spring 289 urges the secondary piston 252 rightward (as viewed in FIG. 4) toward the unactuated position of the second piston 252. An annular insert 290 having a radially outwardly extending flange 292 is mounted in the primary chamber 256, with the flange 292 engaging the shoulder 238 between the first portion 232 and the third portion 235 of the bore 230. A primary cup seal 295 is axially captured between the insert 290 and the end plug 282. During assembly, the secondary piston 252 is assembled into the bore 230 prior to inserting the insert 290, as the inside diameter of the annular insert 290 will normally be chosen to be less than the outside diameter of the secondary piston 252 as measured through the flange formed by the clip 266.

The secondary piston 252 is mounted in the bore 230 for reciprocating movement. The second end 262 of the secondary piston 252 extends into the second portion 234 of the bore 230. The outer diameter of the first end 261 of the piston 252, including the radially outwardly extending flange formed by the clip 266, has an outer diameter which is greater than the inside diameter of the second portion 234 of the bore 230. Thus the flange formed by the clip 266 on the secondary piston 252 is prevented from moving leftwardly (as viewed in FIG. 4) past the shoulder 236, or rightwardly past the annular insert 290.

The purpose in limiting rightward movement of the secondary piston 252 is to prevent the primary piston 250 from being inadvertently ejected from the master cylinder 200 during assembly or maintenance. The spring 289 urges the secondary piston 252 against the primary piston 250 and the caged spring assembly fixed to the primary piston 250. Without the clip 266 engaging the annular insert 290, when the input rod limiting rightward movement of the primary piston 250 is disconnected, the spring 289 could cause the second piston to push the primary piston 250 out of the master cylinder 200.

In the extremely unlikely event of a catastrophic failure of the body 220 surrounding the secondary chamber 258, or of the end plug 284 or of the flange 288 retaining the end plug 284, resulting in a circumferential breach of the secondary chamber 258, all braking systems supplied by the master cylinder 200 would not be lost. Although the secondary hydraulic brake circuit normally supplied by pressurized fluid from the secondary chamber 258 will fail, the secondary piston 252 would not be ejected from the bore 230 of the master cylinder 200. The secondary piston 252 would be retained in the bore 230 by the flange on the second end 261 of the secondary piston 252, formed by the clip 266, which would contact the shoulder 236, preventing the secondary piston 252 from being expelled from the bore 230. Thus the primary chamber 256, which includes as its pressure boundaries the secondary piston 252 and the secondary wiper seal 237, would remain intact, and the primary hydraulic brake circuit would remain operative.

While the master cylinder 200 is shown as a tandem master cylinder, it will be recognized by those of ordinary skill in the art that the same principles could be applied to master cylinders having more pistons, by providing a flange piston at the end of the master cylinder bore opposite the primary piston, and a shoulder formed in the bore to act as a stop engaged by the flange. Suitable inserts would have to be provided to support the seals associated with the remaining pistons in the master cylinder. Suitably, such inserts could also provide radial support for pistons reciprocating therein.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A master cylinder housing comprising:
    a body having a bore formed therethrough, said body defining a circumferential shoulder in said bore and a radially inwardly extending circumferential flange in said bore, said flange being spaced apart from said shoulder; and
    a plug having a circumferential extending perimeter portion disposed between said shoulder and said flange, said shoulder and said flange cooperating to fix said plug in said body.

2. The master cylinder housing of claim 1, in which said flange is a radially deformed portion of said body.

3. The master cylinder housing of claim 1, in which said circumferential extending perimeter portion of said plug has a circumferential groove formed therein, said master cylinder housing further including a seal seated within said circumferential groove to form a leak-tight seal between said body and said plug.

4. A method for retaining a plug in a stepped bore of a master cylinder, comprising:
    a. providing a body having a stepped bore with a radially extending shoulder defined therein;
    b. inserting a plug in said stepped bore so that a circumferentially extending peripheral portion of said plug engages said shoulder; and
    c. deforming said body to form a flange extending radially inwardly into said stepped bore, thereby capturing said plug between said portion of said body and said shoulder.

5. the method of claim 4, wherein step b further includes the step of inserting a seal between said portion of said body and said plug to form a leak-tight seal between said body and said plug.

6. A spring assembly for a master cylinder, comprising:
    a piston having a bore formed therein;
    a pin having a first end and a second end, said first end being longitudinally regular, said first end being retained in said bore of said piston by a frictional engagement therebetween; and
    a spring having first and second ends, said first end of said spring being in a fixed position relative to said piston, said second end of said spring being moveable relative to said pin between an extended position fixed relative to said pin, where said second end of said spring is operatively coupled to said pin, and a compressed position between said extended position and said piston.

7. The spring assembly of claim 6, in which said first end of said pin is a smooth cylindrical surface.

8. The spring assembly of claim 6, in which said first end of said pin has a knurled surface.

9. The spring assembly of claim 6, in which said first end of said pin is provided with straight longitudinally extending flutes.

10. The spring assembly of claim 6, in which said bore in said piston is provided with longitudinally extending flutes.

11. The spring assembly of claim 6 further including a retainer having first and second ends, said first end of said retainer forming a radially extending flange, said flange, said second end of said pin, and said piston cooperating to retain said first end of said retainer between said piston and said second end of said pin, said second end of said retainer operatively coupled to said second end of said spring.

12. An assembly apparatus for fixing the pin of a caged spring assembly to a piston, comprising:
    a hollow guide tube having an open end and an outer end surface about the open end of the guide tube, said guide tube defining a longitudinal axis;
    a member disposed within said guide tube for supporting a piston having an axial bore formed therein, with said axial bore aligned with said longitudinal axis of said guide tube; and
    a plunger having a first end for inserting into said guide tube, and an outwardly extending flange formed therein and spaced apart from said first end of said plunger, said flange of said plunger engaging the end surface of said guide tube to limit movement of said plunger into said guide tube, said plunger being operable to selectively bear against a first end of a pin of a caged spring assembly to urge a second end of the pin into said bore in the piston until said flange is in contact with the end surface of said guide tube.

13. The assembly apparatus of claim 12 further including an adjustment pin for supporting a piston in said guide tube at a predetermined distance from said outer end surface.

14. A method of assembling a caged spring assembly onto a piston of a master cylinder, including the steps of:
    a. providing a master cylinder piston having a bore formed therein;
    b. providing a spring having a first end and a second end, and placing the first end of said spring against said piston;
    c. providing a spring retainer, and operatively engaging said second end of said spring with said spring retainer; and
    d. pressing a pin with a straight in motion into said bore so as to engage said bore with a press fit, and so said pin engages said spring retainer, whereby said spring retainer and said pin cooperate to capture said spring between said spring retainer and said piston.

15. A master cylinder having a piston stop, comprising:

a master cylinder body having a stepped bore formed therein, said stepped bore having a first portion and a second portion, said first portion of said bore having a first inside diameter, said second portion of said bore having a second inside diameter smaller than said first inside diameter, a shoulder being formed between said first portion of said bore and said second portion of said bore;

a piston mounted in said bore for reciprocating movement, said piston partially extending into said second portion of said bore, said piston having a circumferential groove formed therein; and an arcuate clip seated in said circumferential groove.

* * * * *